US009782952B2

(12) United States Patent
Weiss

(10) Patent No.: US 9,782,952 B2
(45) Date of Patent: Oct. 10, 2017

(54) LAMINATED PANE

(71) Applicant: Albert Weiss, Osterburken (DE)

(72) Inventor: Albert Weiss, Osterburken (DE)

(73) Assignee: PAN-DUR Holding GmbH & Co. KG, Ravenstein (DE)

( * ) Notice: Subject to any disclaimer, the term of this patent is extended or adjusted under 35 U.S.C. 154(b) by 69 days.

(21) Appl. No.: 14/555,797

(22) Filed: Nov. 28, 2014

(65) Prior Publication Data

US 2015/0151511 A1    Jun. 4, 2015

(30) Foreign Application Priority Data

Nov. 28, 2013   (DE) .................. 10 2013 113 166
May 21, 2014    (DE) .................. 10 2014 107 165

(51) Int. Cl.
| B32B 3/10 | (2006.01) |
| B32B 7/12 | (2006.01) |
| B32B 7/04 | (2006.01) |
| E06B 3/663 | (2006.01) |
| E06B 3/673 | (2006.01) |
| A47F 3/04 | (2006.01) |

(52) U.S. Cl.
CPC ............... *B32B 7/12* (2013.01); *B32B 7/045* (2013.01); *E06B 3/66333* (2013.01); *E06B 3/6733* (2013.01); *A47F 3/0434* (2013.01); *B32B 2250/02* (2013.01); *B32B 2509/10* (2013.01); *Y10T 428/24777* (2015.01)

(58) Field of Classification Search
None
See application file for complete search history.

(56) References Cited

U.S. PATENT DOCUMENTS

| 4,660,903 A | 4/1987 | Shinagawa |
| 4,822,649 A | 4/1989 | Canaud et al. |
| 6,490,832 B1 | 12/2002 | Fischbach et al. |
| 2011/0267833 A1* | 11/2011 | Verrat-Debailleul B32B 17/10036 362/545 |

FOREIGN PATENT DOCUMENTS

| DE | 10 2011 009 879 | 8/2012 |
| EP | 0 138 782 | 4/1985 |
| GB | 2 241 013 | 8/1991 |
| WO | WO 2012/163748 | 12/2012 |

OTHER PUBLICATIONS

EP Search Report, May 8, 2015.

* cited by examiner

*Primary Examiner* — Christopher Polley
(74) *Attorney, Agent, or Firm* — Dority & Manning, P.A.

(57) ABSTRACT

A laminated pane has at least two panes running, for example, parallel to one another, in which case the panes are joined together in an edge area of the laminated pane, at least in sections, with the help of a transparent mass and/or one that becomes transparent after hardening, preferably in form of glue.

15 Claims, 11 Drawing Sheets

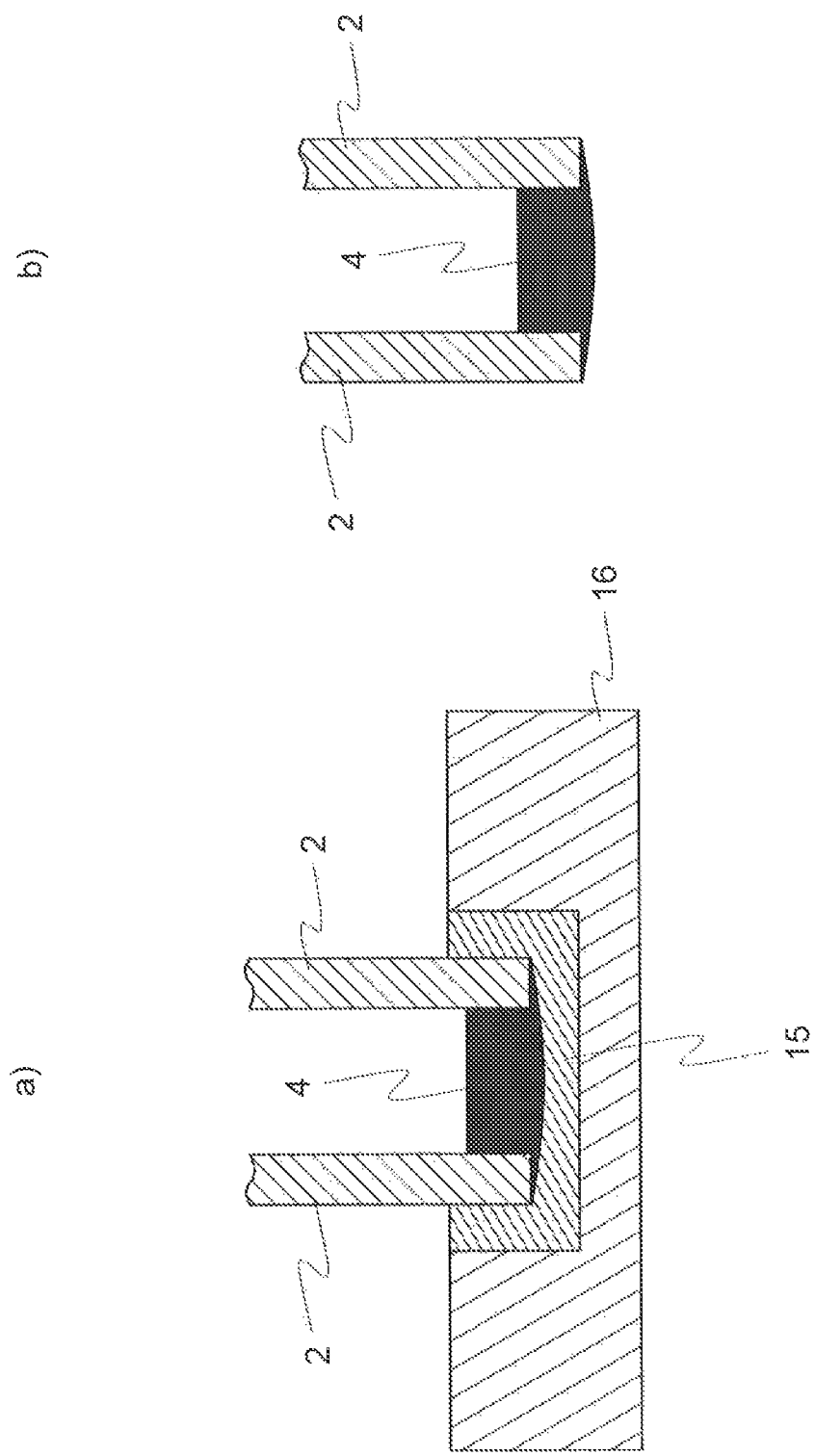

LAMINATED PANE

FIELD OF THE INVENTION

The present invention refers to a laminated pane can be used for any purposes. For example, it could be conceivable to use the laminated pane as door, side or partition wall of a product presentation appliance, preferably of a refrigeration appliance. It is also conceivable for the laminated pane to be a glass partition wall or another element that allows the passage of light.

SUMMARY OF THE INVENTION

Additional objects and advantages of the invention will be set forth in part in the following description, or may be obvious from the description, or may be learned through practice of the invention.

In any case, the laminated pane is characterized by the fact that it comprises at least two transparent panes (preferably same-sized) that can run, for example, parallel to one another, in which case the panes are joined in the edge area of the laminated panes, at least in sections, preferably exclusively, with the help of a transparent mass or one that becomes transparent after hardening, preferably in the form of a glue. While parallel running panes are preferred, the panes can naturally also not run parallel to one another. The resulting various separations of the panes to one another are finally bridged by the mass, so that the non-parallel running panes can also be joined fully or only partially to one another in their edge areas or in areas lying in-between. Even if the laminated pane comprises further elements such as the reinforcements that will be mentioned below, the panes are preferably joined exclusively by the mass (or supported by the reinforcements), so that no more joining elements like metal frames or the like must be provided. Incidentally, the mass does not have to extend over the entire circumferentially-sided edge area, but it is enough if it is arranged only in one or several front or lateral areas of a rectangular laminated pane, for example). Apart from joining the panes in their circumferential edge area, a partial or full joining in the remaining areas is conceivable.

It is advantageous for the laminated pane to have, in the area of at least two corner areas, a reinforcement arranged between the (for example, parallel-running) panes for tying down to a support. The support can be a frame element for attaching and movably mounting the laminated pane (it is for example conceivable for the support to be a section of a refrigeration appliance). Needless to say, one or several reinforcing elements can also be arranged on other spots of the laminated pane, in which case they should in any case extend at least partially between two continuous panes. It is also useful to embed one or several of the existing reinforcements at least partially in the mass to increase the stability of the laminated pane.

It is furthermore conceivable for the laminated pane to be reinforced in only one corner area or one side (e.g. in the front side facing upward for the intended use). It would be conceivable, in particular, for the laminated pane to be mounted hanging merely from one reinforcement. In addition to the attachment to the reinforcement(s) that serve to join to a corresponding support frame (e.g. of a refrigeration appliance), additional reinforcements can naturally also be arranged between the individual panes, not for tying down the laminate pane but merely to stabilize it, in which case the additional reinforcements can also be formed by the mass described above.

It is advantageous if each one of the reinforcements has at least one depression accessible from the exterior (e.g. a bore hole and/or a bolt accessible from the exterior) through which the laminated pane can be connected to a support. As a result of this, the laminated pane can be mounted so it can swivel around an axis formed by the two reinforcements.

It is advantageous if the reinforcements are arranged in the area of two front sides of the laminated pane lying opposite one another, preferably in the shorter front sides of the laminated pane executed as rectangle.

It is advantageous if the reinforcements are joined directly, for example glued, with one another with at least two panes. In this case, the reinforcements lie directly on the insides opposite the contiguous panes.

It is advantageous if the reinforcements comprise in each case a metal block or are executed as a metal block, in which case the metal block should have the above-mentioned depressions and/or bolts.

It is advantageous if the reinforcements are at least partially embedded in the mass. It is thus conceivable for the reinforcements to be completely surrounded by the mass except for the areas that lie directly on the contiguous panes and the areas that are accessible from the exterior due to mounting on a support.

It is advantageous if the mass juts out to the exterior from the panes, at least in sections, to form an edge protection that can prevent damage to the panes.

It is advantageous if the mass is a plastic, e.g. an acryl-based glue. Likewise, the mass according to the invention can be a PU-based glue. Finally, mixtures of these products with one another or with silicon can be used. Generally speaking, the mass is not restricted to certain types of substances or chemical compounds; rather, it is decisive for the mass to become transparent after it has hardened to allow a view through the panes making contact with one another and through the mass as well. Furthermore, the mass should adhere to the panes so the panes can be joined together.

It is advantageous if—apart from the mass and the reinforcements—no more elements are arranged between the panes. Likewise, the laminated pane should not be surrounded by any kind of framing either to ensure an unimpeded view through the laminated pane.

It is advantageous if the panes limit a closed hollow interior of the laminated pane together with the mass. In this case, the laminated pane is executed as an insulating glass pane. Especially when the laminated pane has one or several reinforcements (at least preferably made mainly of glass or plastic) in addition to the panes and the mass, it can mounted on one or several corresponding shelves of a refrigeration appliance through the respective hinges, bolts or other connection pieces and thus serve as door or another access opening limitation element.

It is advantageous if the interior is filled with a gas or gas mixture, e.g. a noble gas or air. It is likewise conceivable for the interior to be filled partially or also fully with a transparent (i.e. see-through) liquid such as water or an aqueous substance. Transparent solids that can be present as congealed molten mass should not be ruled out either.

It is advantageous if an inner surface of the mass limiting the interior of the laminated pane runs perpendicularly to the panes. In this case, the mass has a largely rectangular shape in a cut running perpendicularly to the panes, in which case the surface sections of the mass facing the exterior can also be executed to be convex.

It is advantageous if an external side of one of the panes is provided with at least one handle and the handle or a support element is glued to the pane, for example. In this case, the laminated pane can be used as door or window.

It is advantageous if, in addition to the above-mentioned edge area, the laminated pane has one or several struts running between the contiguous panes and these struts are also made of a transparent mass and/or one that becomes transparent after hardening. The interior of the laminated pane can in this case be partitioned into several hollow sections to increase its stability.

It is advantageous if the transparent mass and/or one that becomes transparent after hardening runs over the entire circumference of the laminated pane. In this case, the mass forms a frame-shaped area that runs between the panes and surrounds the interior hollow space along the entire edge area of the laminated pane.

It is advantageous if the laminated pane forms a section of a product presentation appliance, especially of a refrigeration appliance, for the placement and presentation of merchandise to be refrigerated, especially foodstuffs, in which case the product presentation appliance comprises a space for presenting merchandise and in which case the section that limits the placement space is at least partially transparent towards the exterior to allow a view of the section in the placement space.

The mass mentioned above can be a kind of glue such as an acryl-based glue. While the laminated pane or section (door or outer wall or partition wall) of the product presentation appliance is being manufactured, two or more panes can be aligned in parallel and fixed in place at a distance of one another. Then, the glue is introduced in the edge area of the laminated pane or in a section of the edge area and subsequently hardened with the help of UV radiation, for example. Before hardening, the glue should have a viscous consistency so it can be easier to introduce it between the corresponding pane sections without the danger of the glue running into unwanted areas.

It is particularly advantageous if the mass is provided as highly viscous glue before hardening so it can be introduced between the corresponding areas before it hardens. The glue can, in principle, be made of multiple components and harden automatically after these components are mixed. Likewise, one- or multi-component glues can be used that harden through an additional process step, e.g. UV radiation.

The laminated pane can also have a spacer, preferably in the area of the upper and/or lower front side, to maintain the panes separate. The spacer can be glued to the panes and be preferably executed in the form of a channel, in which case the channel contains preferably a drying material capable of binding moisture located between the panes to prevent the laminated panes from steaming up. Additionally, the spacer can at the same time form the above-mentioned reinforcement through which the laminated pane is held, for example by a frame element in which the laminated pane is held in a swivelling way, preferably around an imaginary swivel axis extending through the reinforcements.

Also a wall section of a product presentation appliance that has glue can be structured in a comparable way, i.e. the wall section can comprise the above-mentioned laminated pane or be formed by it. The edge area of the laminated pane can, in turn, have sections that include a spacer. Likewise, it is possible for sections to have the above-mentioned mass preferably and exclusively.

It can furthermore be advantageous if at least a first pane of the laminated pane juts out at least in sections from at least a second pane of the laminated pane in the longitudinal and/or transversal direction of the laminated pane so that the latter has a stepped profile in cross section. The panes of a laminated pane can thus definitely have different dimensions. The protruding section of the at least one additional pane that juts out of the pane could serve as a contact surface through which the pane could be displaced along a sliding surface after mounting in a refrigeration appliance.

Generally speaking, it could be pointed out here that the panes of the laminated pane do not necessarily have to be rectangular. Thus, it is also possible for individual or all panes of a laminated pane to have a round, oval or another shape different from a rectangle.

Furthermore, the mass can be introduced in such a way between contiguous panes that it juts out from one or several panes. In this case, the mass forms an edge protection for the laminated pane to reduce the danger of damaging the panes.

Furthermore, the laminated pane can comprise other elements too—in addition to the above-mentioned mass, the panes and the possibly available reinforcements—that do not necessarily serve to stabilize the laminated pane. Conceivably, they can be lighting elements such as LED sources, for example, or also heating elements (e.g. in form of one or several heating wires) to prevent the laminated pane from steaming up, arranged between the panes or embedded at least partially in them.

Finally, the invention refers to a process for manufacturing a laminated pane according to the previous or following description (wherein the individual characteristics of the laminated pane can be present individually or in any combination) as long as the laminated pane comprises at least two panes, running parallel to one another, for example, and as far as the panes are joined together in an edge area of the laminated pane, at least in sections, with the help of a transparent mass and/or one that becomes transparent after hardening, preferably in form of a glue).

The process is characterized by the following process steps that run preferably in immediate succession:

At first, the panes intended for the subsequent laminated pane are placed at a given distance from one another and correspondingly fixed or held in place, in which case the distance should essentially correspond to the gap that the panes should also have in the finished laminated pane.

The next step involves the introduction of a transparent viscous mass or one that becomes transparent after hardening between selected sections of the respective panes. The mass is preferably introduced between two contiguous edge areas of two contiguous panes. Here, with regard to the possible properties of the mass, reference is made on the claims or the corresponding executions in the remaining description.

Concerning this, it is alternately also possible to hold the above-mentioned mass at first in a receptacle (e.g. a depression) and immerse the panes separated from one another in the mass, so that the mass is found at least partially between the contiguous panes after immersion.

After immersion or after the mass has been introduced between the panes as part of the previous first alternative, the mass hardens, and this can occur automatically or with the corresponding extra steps (e.g. UV radiation or heating) depending on the type of mass. In any case, the hardening occurs in such a way that the mass adheres to the sections making contact with it, no later than when it has hardened, so that a laminated pane with several panes joined together forms with the help of the mass, at the latest, when it has hardened.

It is advantageous when the panes, when they are placed as described, are each brought into a form through one of their edge areas and the form is removed once again by the laminated pane after the hardening process has ended. This form can be, for example, at least a partially flexible one that can be gutter-shaped. In any case, it is advantageous if the form also serves as a seat for the mass apart from the correct placement of the panes. The mass can therefore be introduced in the form before or after the panes and is held firmly in the desired place by it even during hardening.

It is advantageous if a form is used whose sections making contact with the panes are executed elastically, at least in sections. This facilitates the removal of the mass from the form after hardening and prevents the mass from adhering to the form. Once the mass has hardened, the form can easily be removed from the laminated pane, cleaned, and reused in the manufacturing of a new laminated pane. In this context, it is also conceivable to make the form, or its sections making contact with the mass, of a kind of silicon.

It is finally advantageous if the mass is arranged in the panes before hardening in such a way that the mass and the panes are arranged relative to one another in such a way before hardening that the mass juts out from at least one of the panes of the laminated panes after hardening has ended so it can form an edge protection for the laminated pane. For example, it could be conceivable for the above-mentioned form to have a lower convex form section. If the panes are now placed in such a way on the form that the convex form section is located between the corresponding panes, then the mass introduced in the form has a convex shape too after hardening and thus protrudes from the contiguous panes, at least slightly.

BRIEF DESCRIPTION OF THE DRAWINGS

Embodiments of the inventions described so far are shown below in the figures:

FIG. 11 is a cross section of the device shown in FIG. 10 and a cross section of the laminated pane manufactured with it.

DETAILED DESCRIPTION

Figure 1:
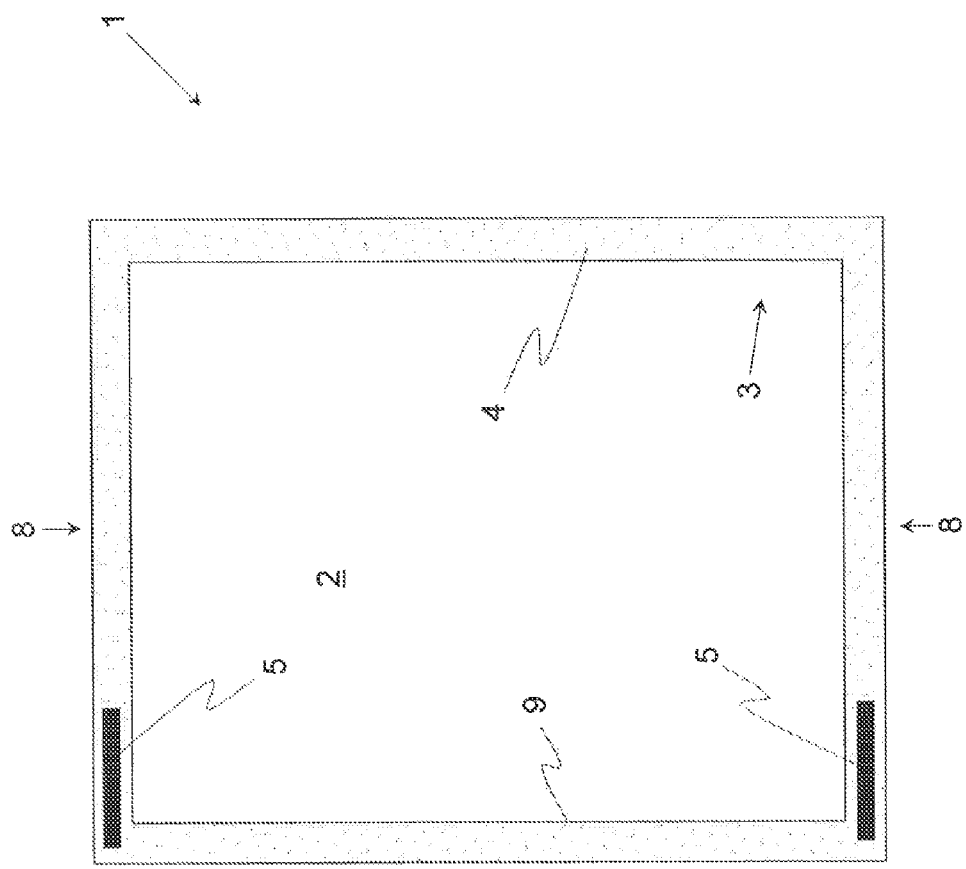
FIG. 1 is a front view of a laminated pane according to the invention.
Figure 2:
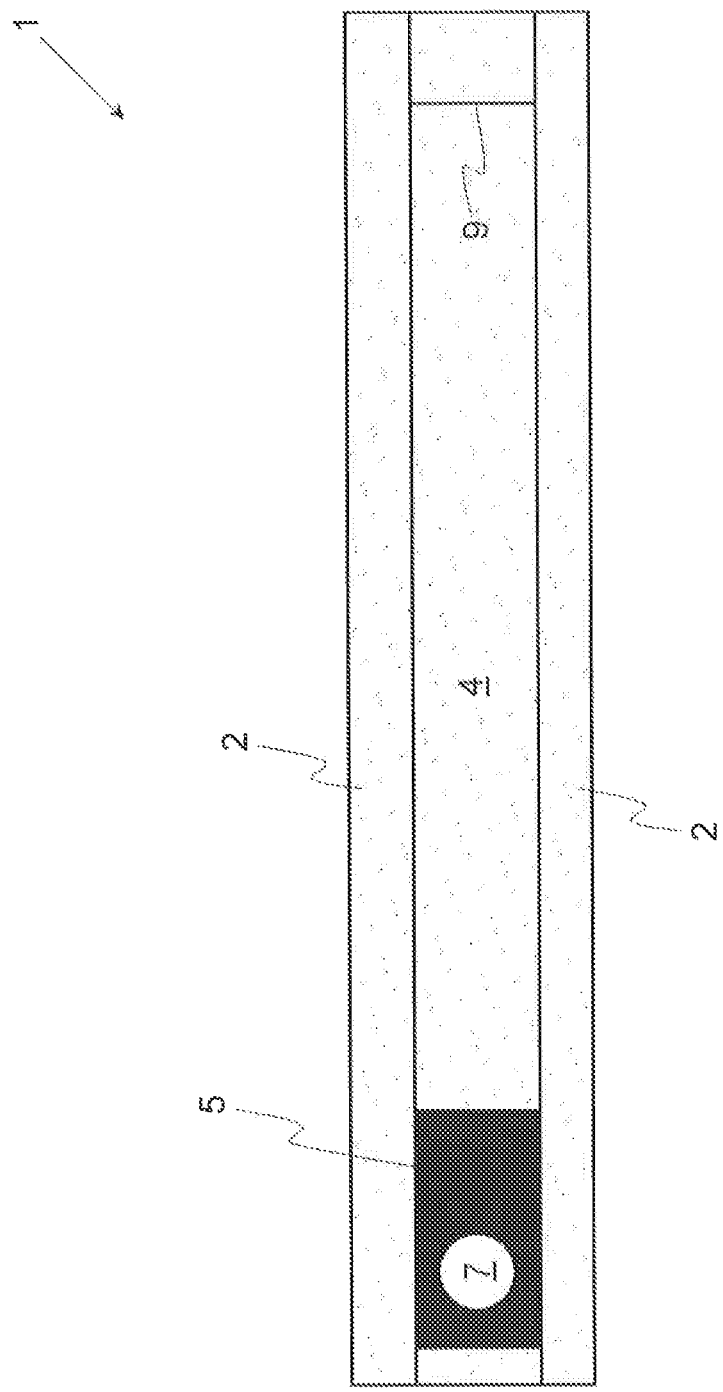
FIG. 2 is a top view of a laminated pane shown in FIG. 1.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a laminated pane 1 according to an embodiment of the invention. The laminated pane 1 comprises at least two panes 2 that, for example, run parallel and are joined together in their circumferential-sided edge area 3 with the help of a transparent mass 4 or one that becomes transparent after hardening, in which case the surfaces 9 of the mass 4 pointing inward run preferably perpendicular to the panes 2. As a comparison of FIGS. 1 (front view) and 2 (top view of the laminated pane 1 shown in FIG. 1) shows, a reinforcement 5 embedded in the mass 4 that can have a depression 7 (or alternately a bolt) can be attached between the panes 2, in each case in a corner area of the laminated pane 1, through which the laminated pane 1 can be connected to a support 6, for example, a frame of a product presentation appliance 11 shown in FIG. 3.

In principle, the laminated pane 1 can be used wherever transparent elements are used. For example, the laminated pane 1 can be used as door or window element, or as another limiting element.

Figure 3:
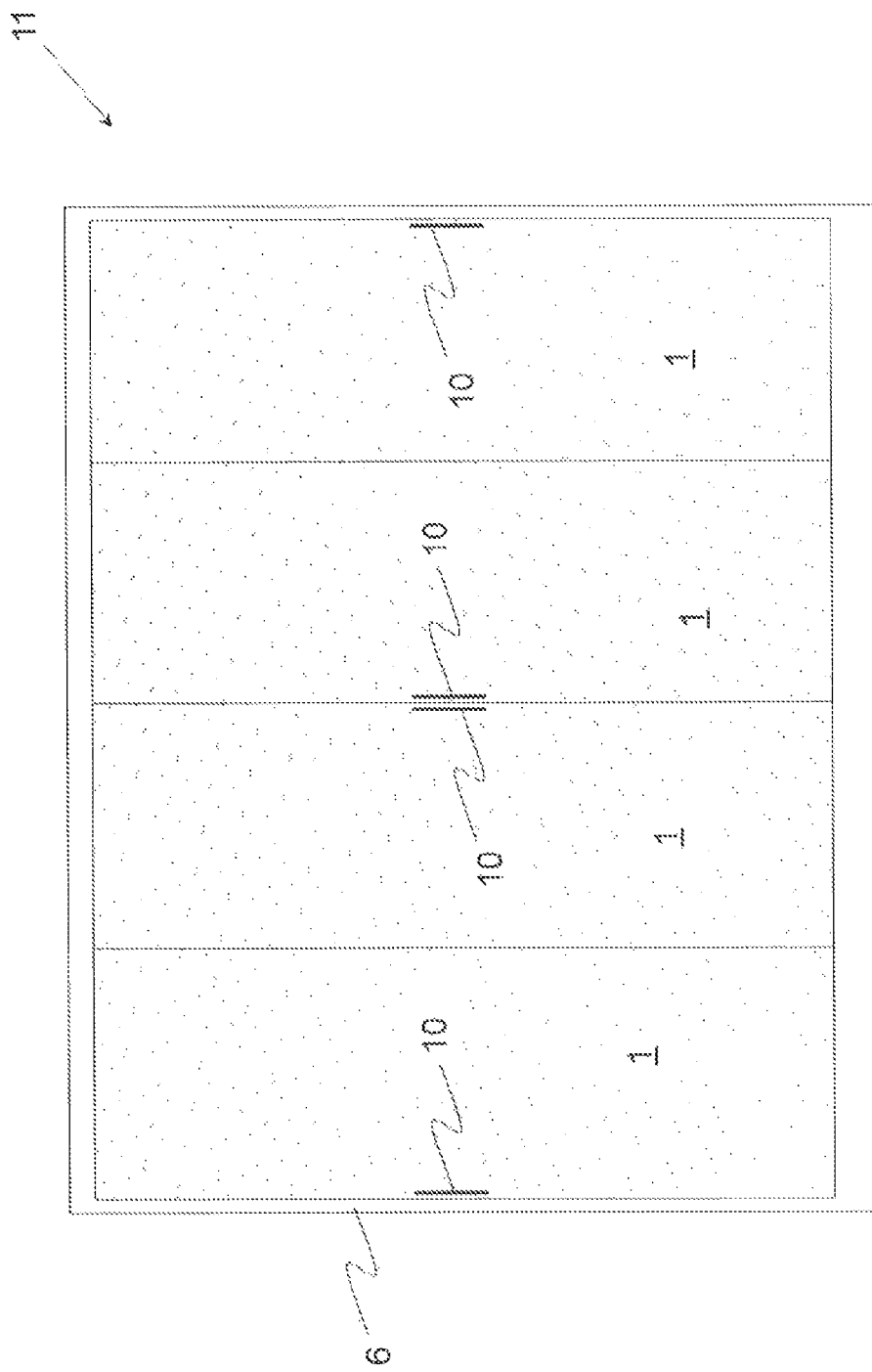
FIG. 3 is a front view of a product presentation appliance.

In particular, the laminated pane 1 can be used as sliding or swinging door, preferably for a product presentation appliance 11, as shown exemplarily in FIG. 3. Generally, the doors mentioned above are made of two or more panes 2 running preferably parallel to one another to improve their insulating effect, as is the case especially when used in refrigeration appliances. Since the panes 2 must be joined (e.g. glued) together, the resulting doors always have in the state of the art a non-transparent edge area 3 which is perceived as bothersome when showing products.

It is therefore suggested to provide at least one of the edge areas 3, preferably the entire circumferential edge area 3, with a corresponding door that includes a handle 10, exclusively with the help of a transparent mass 4 or one that becomes transparent after hardening so the panes 2 can thus be joined in this area. For example, the mass 4 can be preferably a PU- or acryl-based glue added to the contiguous panes of the door when the latter is mounted to effect the joining together of the corresponding panes 2 after hardening.

Figure 4:
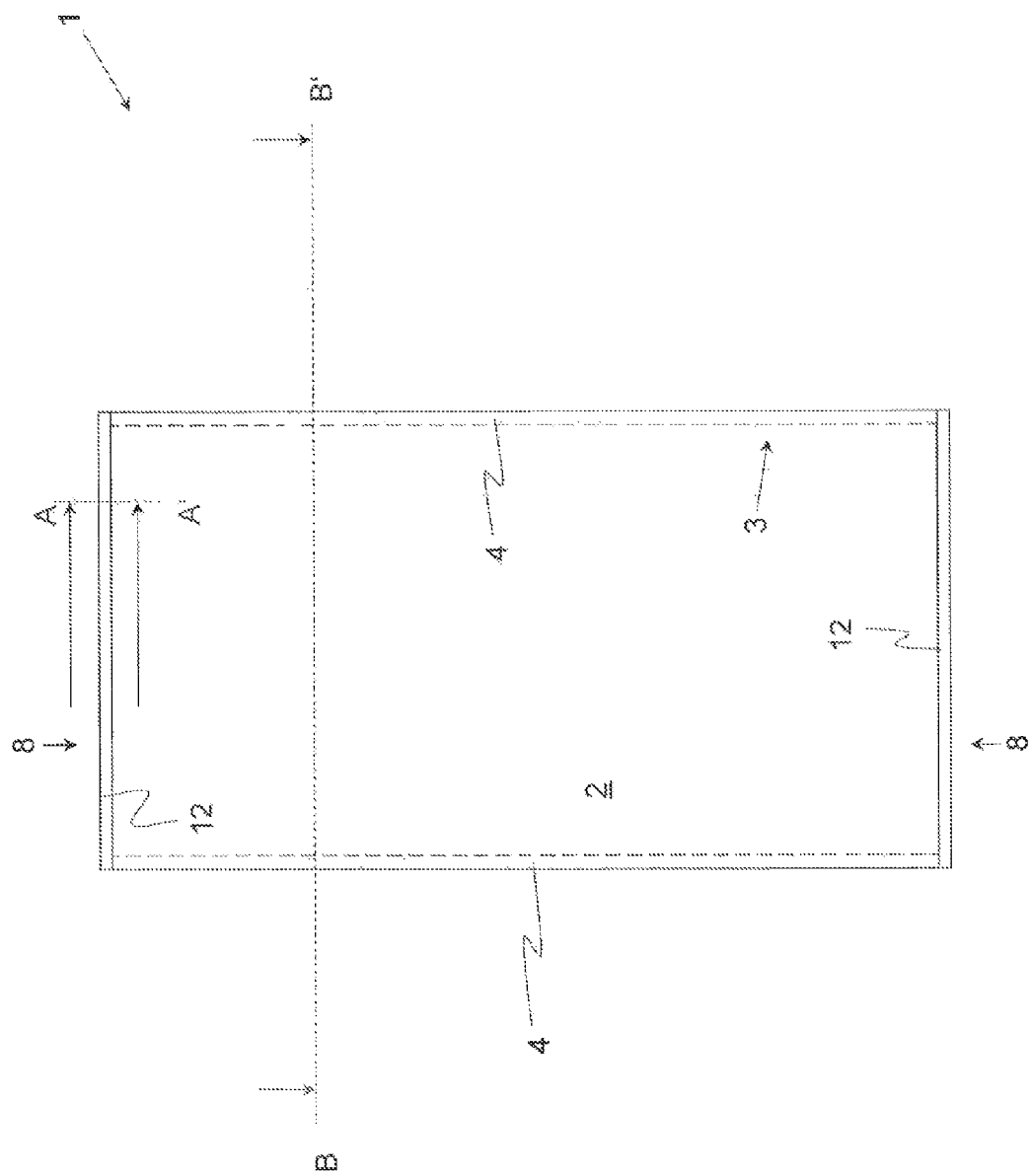
FIG. 4 is a door of a product presentation appliance.
Figure 5:
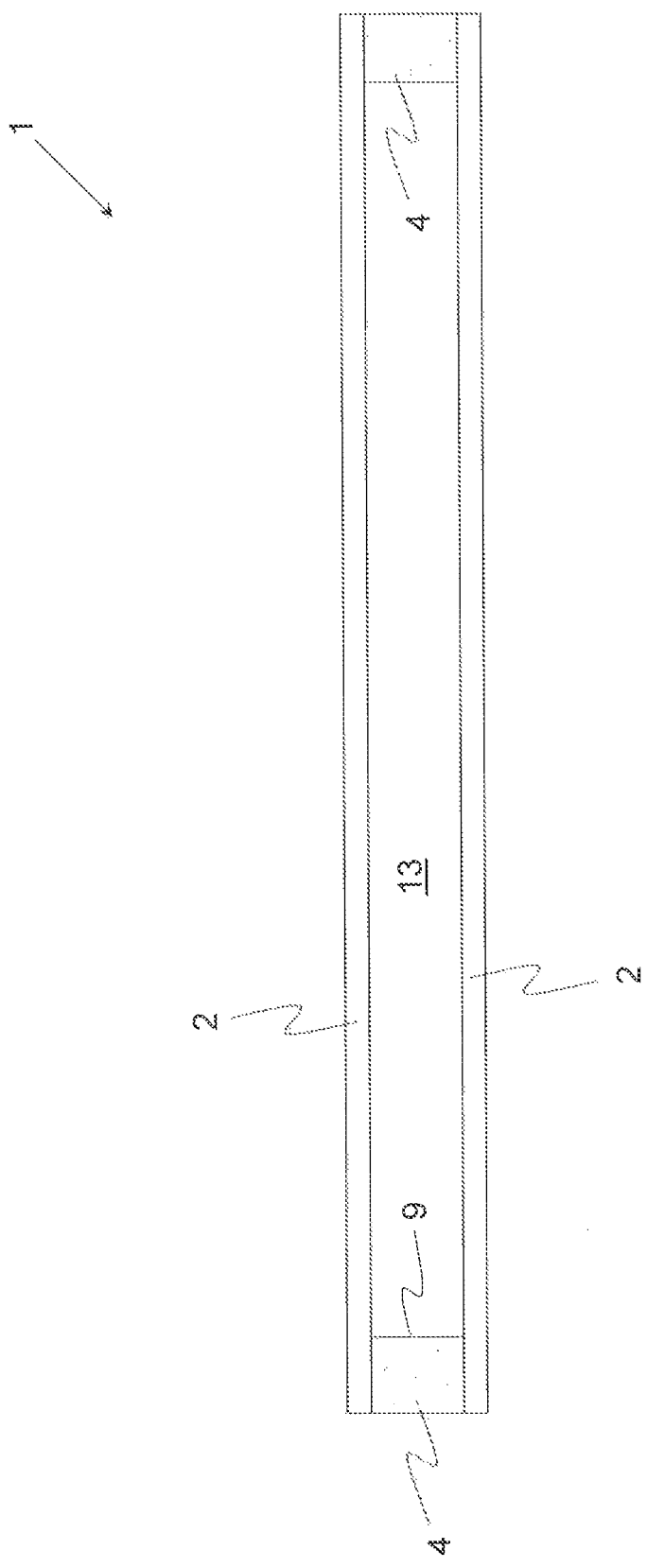
FIG. 5 is a cut view of the door of a product presentation appliance seen from above, e.g. cut along line B-B' in FIG. 4.
Figure 6:
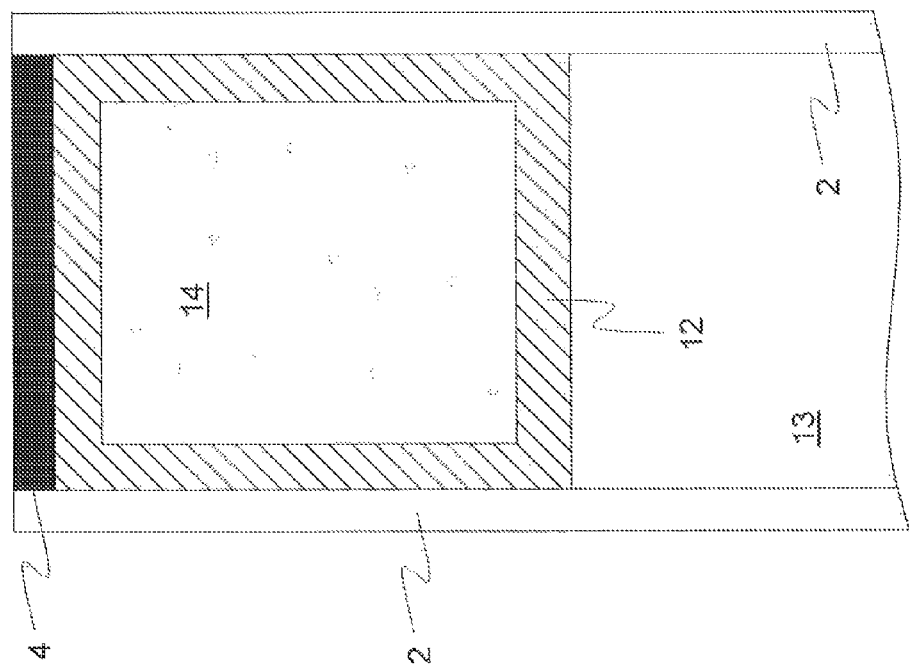
FIG. 6 is a section of a sectional view of the upper part of a door of a product presentation appliance seen from the side, e.g. cut along line A-A' in FIG. 4.

As shown in FIG. 4 (which shows essentially the door of a product presentation appliance 11), the glue can be arranged exclusively in the two lateral edge areas 3 of the door (see also FIG. 5, which shows a cut along line B-B' in the figure). Finally, so-called spacers 12 could be arranged in the area of the front sides 8 (see also the cut along line A-A' in FIG. 4, which is shown in FIG. 6). The spacers 12 could comprise an elongated channel in which hygroscopic material (or generally speaking, a water-binding drying material 14) can be found and that can be sealed towards the outside with the help of a sealant or the above-mentioned transparent mass 4 so water cannot penetrate. The drying material 14 binds the water that diffuses from the interior 13 between the individual panes 2 through the spacer material, thus preventing the inside of the panes 2—and therefore the doors—from steaming up.

By using the glue that becomes transparent after drying up, a door is finally obtained that—when seen from the front (FIG. 3)—gives the impression that there is no material whatsoever in the areas between the individual panes 2 where there is glue. As a result of this, the presentation area of the product presentation appliance 11 is maximized.

Needless to say, apart from vertically aligned doors, it is possible to equip other doors of a product presentation appliance 11, for example the sliding doors or chest coverings of a refrigeration counter, with a laminated pane 1 whose panes 2 are at least partially joined together with the help of the above-mentioned mass 4 in order to maximize the light passage surface area of the corresponding laminated pane 1. Incidentally, the mass 4 need not be impervious to gas. It is generally enough if it is impermeable to liquids to prevent their penetration.

Likewise, the described laminated pane 1 can be used in all other walls of a product presentation appliance 11 that consists of several panes 2. Included here are, for example, side walls that can be mounted in a movable or immovable way.

Figure 7:
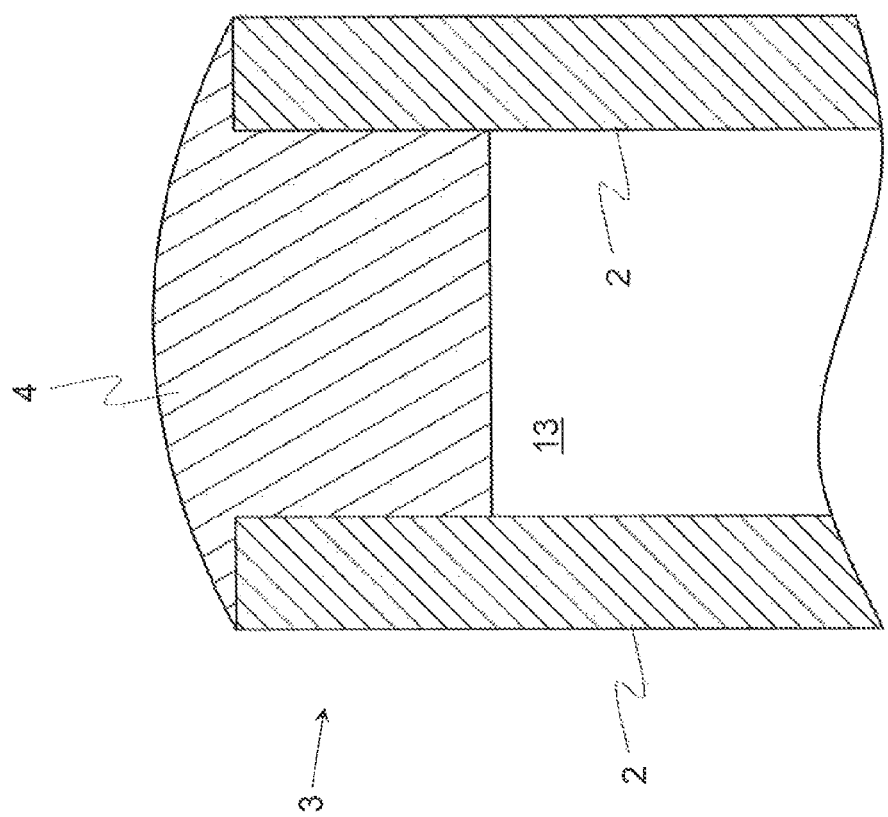
FIG. 7 is a sectional view of a section of a laminated pane according to the invention.
Figure 8:
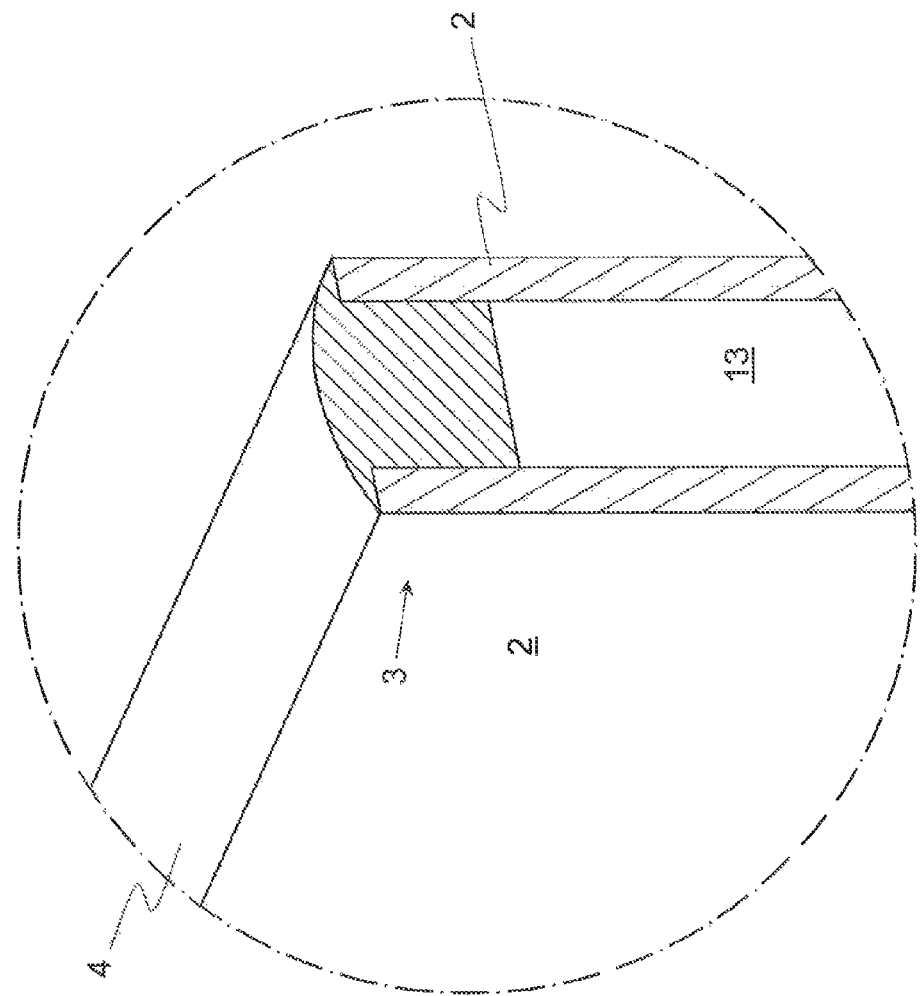
FIG. 8 is a perspective view of a section of the laminated pane shown partially in FIG. 7.

It is furthermore conceivable for the mass 4 to protrude from one or several panes 2 of the laminated pane 1 in its outer edge area 3 (this is shown in FIG. 7 or in the perspective shown in FIG. 8). In this case, the mass 4 acts as edge protector of the panes 2 to reduce the risk of damaging them (incidentally, FIG. 8 only shows the lines/edges that are directly visible; naturally, because the panes 2 and the mass 4 are transparent, more lines or edges are actually visible but they are not shown for reasons of clarity).

Figure 9:
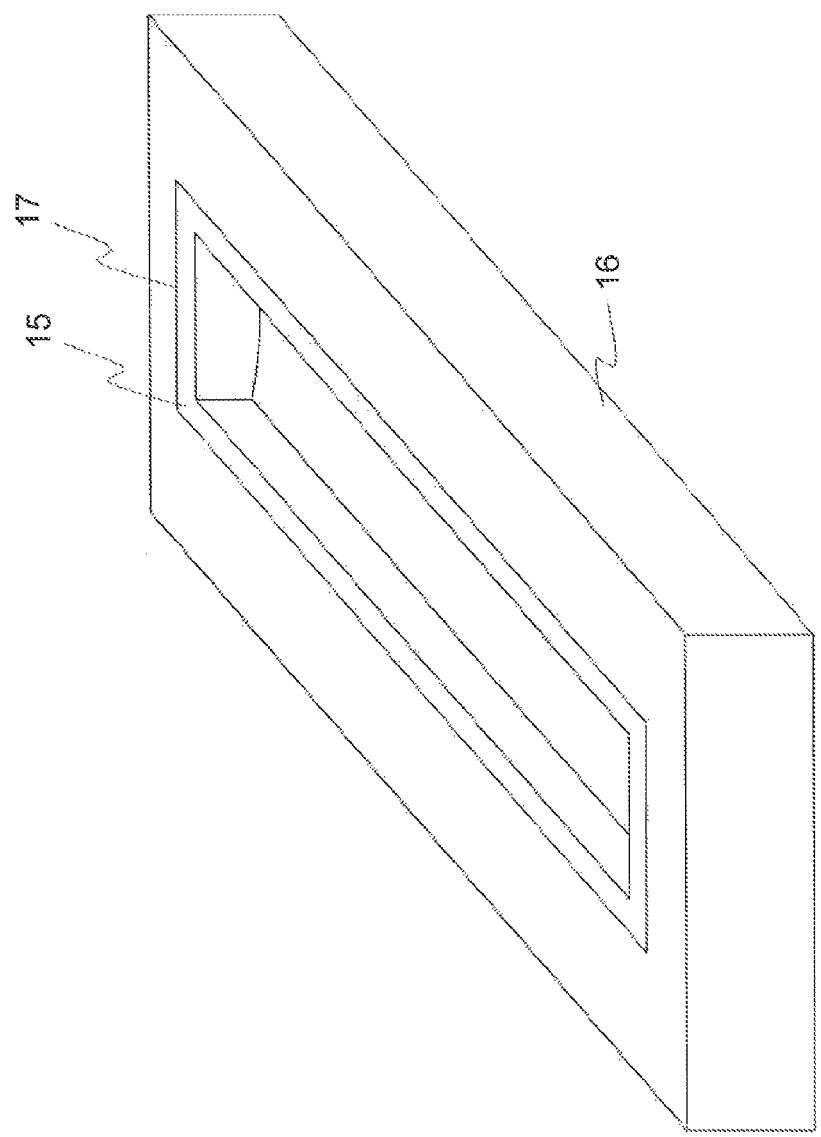
FIG. 9 is a form carrier with an inserted form for the manufacturing of a laminated pane according to the invention.
Figure 10:
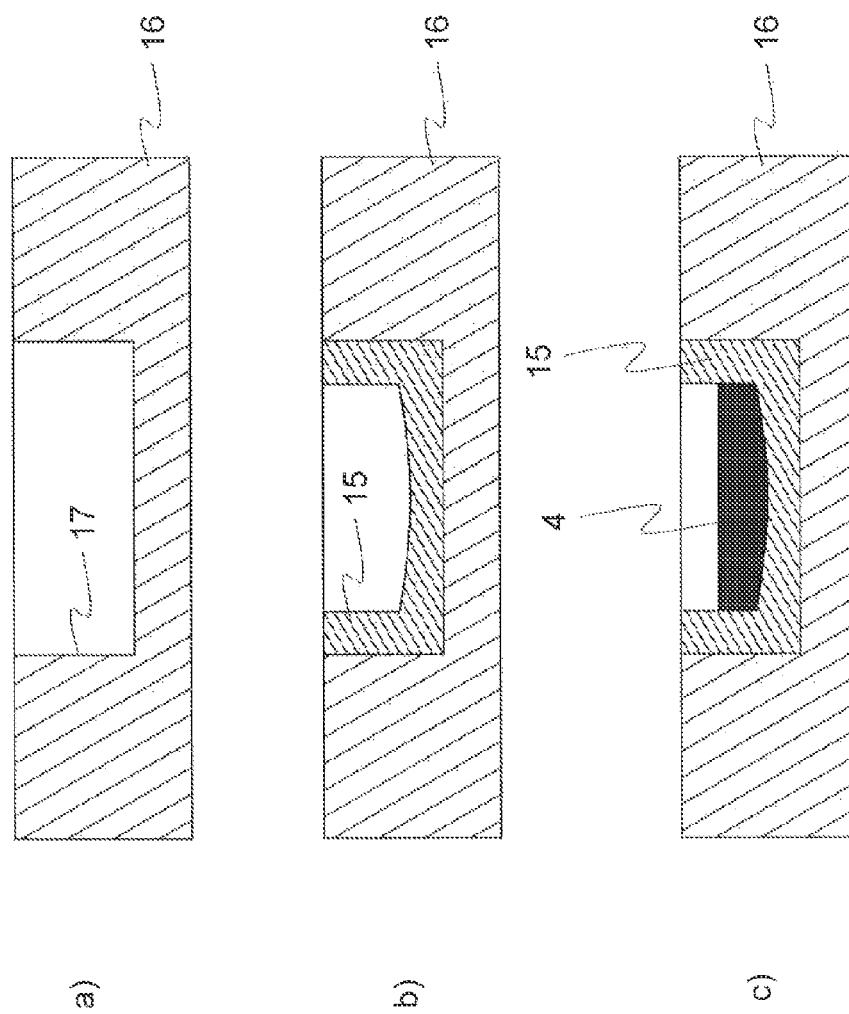
FIG. 10 is Sectional views of the device shown in FIG. 9 during the manufacturing process.

The following description refers to FIGS. 9 to 11.

So the laminated pane 1 can be manufactured, a form carrier 16 shown in FIG. 9 can be used. Regardless of the precise shape that the form carrier 16 provides, it is advantageous if it provides a receptacle 17 for a preferably elastic form 15. It could, for example, be conceivable that the receptacle 17 is executed as slot-shaped depression, into which the above-mentioned form 15 is detachably inserted.

FIG. 10 a) shows a cross section of a possible form carrier 16, while FIG. 10 b) shows the form carrier with introduced form 15.

So at least two panes 2 can be joined together to a laminated pane 1, a possible variant allows the form to be filled at first with the described mass (FIG. 10 c)).

Afterwards, the panes 2 of the subsequent laminated pane 1 (shown in FIG. 11 a)), are immersed in the mass 4 and held accordingly. The mass 4 hardens in the next step, and in the case of two-component glue, this takes place as a rule after a certain time once the components have been mixed.

Finally, the laminated pane 1 is taken out of the form carrier 16 or form 15 (if the form is removed with the laminated pane 1, then the form 15 must be removed from the laminated pane 1 in a subsequent step).

Ultimately, a laminated pane 1 is obtained whose panes 2 are joined together in at least one edge area with the help of the hardened mass 4. If more edge areas need to be joined together, the laminated pane 1 must be merely rotated and the process steps described above repeated in another place of the laminated pane 1.

These inventions are not restricted to the embodiments shown and described above. Rather, any numbers of combinations of the characteristics described in the claims and in the description, and shown in the figures, are part of the present disclosure as long as technically feasible.

The invention claimed is:

1. A laminated pane, comprising:
    two panes disposed in a parallel or non-parallel orientation and having a circumferential edge;
    a plurality of spacer sections disposed between the two panes in a peripheral edge area of the laminated pane, at least one spacer section being formed by a mass of hardened glue composition that is transparent and adhered to the two panes, the mass of hardened glue composition extending inwardly a limited distance between the two panes and defining an inner exposed edge that together with the two panes and the other ones of the plurality of spacer elements delimits a closed hollow interior space.

2. The laminated pane according to claim 1, further comprising a reinforcement arranged between the panes in at least two corner areas of the circumferential edge, the reinforcements having a hole or recess defined therein that is accessible between the panes for securing the laminated pane to an exterior support structure.

3. The laminated pane according to claim 2, wherein the reinforcements are disposed at opposite sides of the laminated pane and are comprises metal blocks that are embedded at least partially in the mass.

4. The laminated pane according to claim 3, wherein the mass extends exteriorly outward beyond the two panes, and wherein no other elements are arranged between the panes apart from the mass and the reinforcements.

5. The laminated pane according to claim 1, wherein the closed interior space is filled with one of a gas, gas mixture, or transparent liquid.

6. The laminated pane according to claim 1, further comprising a handle attached to an external side of one of the panes.

7. The laminated pane according to claim 1, wherein the transparent mass extends completely around the circumferential edge of the laminated pane.

8. The laminated pane according to claim 1, wherein one of the two panes extends circumferentially beyond the other pane along at least one edge section such that the laminated pane has a stepped profile in cross section along the at least one edge section.

9. The laminated pane according to claim 1, wherein the laminated pane is a panel of a refrigeration appliance that serves for placing and presenting refrigerated foodstuffs, the laminated pane serving to limit a space in the refrigeration appliance for placing the food stuffs and providing a transparent view into the space from external to the refrigeration appliance.

10. The laminated pane according to claim 1, wherein the inner exposed edge of the mass is perpendicular to the two panes.

11. A process for manufacturing the laminated pane in accordance with claim 1, comprising:
    a) placing at least two panes at a given distance from one another and introducing a viscous mass that is transparent or becomes transparent after hardening between selected sections of the panes; and
    b) Hardening the mass, in which case the mass adheres onto the sections of the corresponding panes making contact with it, so that a laminated pane is created with the two panes joined together with the hardened mass.

12. The process according to claim 11, wherein the viscous mass is introduced by holding the mass in a receptacle and subsequently partially immersing the two panes separated from one another in the mass so that the mass after immersion lies at least partially between the separated panes.

13. The process according to claim 12, wherein edge areas of the two panes are brought into a form in which the mass is poured for the immersion step, wherein the form is removed after the mass has hardened.

14. The process according to claim 13, wherein the form is made from an elastic material.

15. The process according to claim 11, wherein the panes are arranged relative to the mass prior to hardening of the mass such that the mass when hardened extends circumferentially beyond the panes and forms an edge protection of the laminated pane.

* * * * *